United States Patent [19]
Ling et al.

[11] Patent Number: 5,754,599
[45] Date of Patent: May 19, 1998

[54] METHOD AND APPARATUS FOR COHERENT CHANNEL ESTIMATION IN A COMMUNICATION SYSTEM

[75] Inventors: Fuyun Ling, Hoffman Estates; Terry Michael Schaffner, Palatine, both of Ill.

[73] Assignee: Motorola, Inc., Schaumburg, Ill.

[21] Appl. No.: 582,856

[22] Filed: Jan. 4, 1996

[51] Int. Cl.6 .................................................. H04L 27/06
[52] U.S. Cl. .......................... 375/340; 375/341; 370/209
[58] Field of Search .............................. 375/340, 341, 375/262, 343, 324, 325, 261; 370/208, 209

[56] References Cited

U.S. PATENT DOCUMENTS

| | | |
|---|---|---|
| 4,914,699 | 4/1990 | Dunn et al. ........................ 375/202 |
| 5,164,959 | 11/1992 | Cai et al. ........................... 375/200 |
| 5,544,156 | 8/1996 | Teder et al. ........................ 375/206 |

*Primary Examiner*—Don N. Vo
*Attorney, Agent, or Firm*—Richard A. Sonnentag

[57] ABSTRACT

Generally stated, a receiver in a communication system implements coherent channel estimation by first receiving an encoded signal and then generating a complex channel estimate from the encoded signal. The receiver then combines the complex channel estimate with the encoded signal to produce a coherent demodulated signal. After combining, the receiver decodes a version of the coherent demodulated signal to produce an estimate of the encoded signal prior to encoding.

14 Claims, 2 Drawing Sheets

—PRIOR ART—

METHOD AND APPARATUS FOR COHERENT CHANNEL ESTIMATION IN A COMMUNICATION SYSTEM

FIELD OF THE INVENTION

The present invention relates generally to communication systems, and more particularly, to coherent channel estimation in a communication system. Reference is made to U.S. Patent Application No. (Docket CE02930R), "Improved Channel Estimation in a Communication System" on behalf of Sexton et al. and commonly assigned to the assignee of the pending application, containing related subject matter the disclosure of which is herein incorporated by reference.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

One type of communication system is a spread-spectrum system. In a spread-spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread-spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Three general types of spread-spectrum communication techniques exist, including direct sequence modulation, frequency and/or time hopping modulation, and chirp modulation. In direct sequence modulation, a carrier signal is modulated by a digital code sequence whose bit rate is much higher than the information signal bandwidth.

Information (i.e., the message signal consisting of voice and/or data) can be embedded in the direct sequence spread-spectrum signal by several methods. One method is to add the information to the spreading code before it is used for spreading modulation. It will be noted that the information being sent must be in a digital form prior to adding it to the spreading code, because the combination of the spreading code and the information typically a binary code involves modulo-2 addition. Alternatively, the information or message signal may be used to modulate a carrier before spreading it.

These direct sequence spread-spectrum communication systems can readily be designed as multiple access communication systems. For example, a spread-spectrum system may be designed as a direct sequence code division multiple access (DS-CDMA) system. In a DS-CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. These unique user spreading codes preferably are orthogonal to one another such that the cross-correlation between the spreading codes is low (i.e., approximately zero).

Particular transmitted signals can be retrieved from the communication channel by despreading a signal representative of the sum of signals in the communication channel with a user spreading code related to the particular transmitted signal which is to be retrieved from the communication channel. Further, when the user spreading codes are orthogonal to one another, the received signal can be correlated with a particular user spreading code such that only the desired user signal related to the particular spreading code is enhanced while the other signals for all of the other users are de-emphasized.

It will be appreciated by those skilled in the art that several different spreading codes exist which can be used to separate data signals from one another in a DS-CDMA communication system. These spreading codes include but are not limited to pseudonoise (PN) codes and Walsh codes. A Walsh code corresponds to a single row or column of the Hadamard matrix.

Further it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Typically, channel coding reduces the probability of bit error, and/or reduces the required signal to noise ratio (usually expressed as bit energy per noise density i.e., $E_b/N_0$ which is defined as the ratio of energy per information-bit to noise-spectral density), to recover the signal at the cost of expending more bandwidth than would otherwise be necessary to transmit the data signal. For example, Walsh codes can be used to channel code a data signal prior to modulation of the data signal for subsequent transmission. Similarly PN spreading codes can be used to channel code a data signal.

However, channel coding alone may not provide the required signal to noise ratio for some communication system designs which require the system to be able to handle a particular number of simultaneous communications (all having a minimum signal to noise ratio). This design constraint may be satisfied, in some instances, by designing the communication system to coherently detect transmitted signals rather than using non-coherent reception techniques. In coherent detection systems, the channel response is determined so that the affects of phase and magnitude distortions caused by the communication channel can be compensated for with matched filters. In contrast, non-coherent detection systems typically do not compensate for the phase distortion in a received signal which was caused by the communication channel. It will be appreciated by those skilled in the art that a coherent receiver requires less signal to noise ratio (in $E_b/N_0$) than that required by a non-coherent receiver having the same bit error rate (i.e., a particular design constraint denoting an acceptable interference level). Roughly speaking, there is a three deciBel (dB) difference between them for the static channel and even greater for the Rayleigh fading channels. The advantage of the coherent receiver is more significant when diversity reception is used, because there is no combining loss for an optimal coherent receiver while there is always a combining loss for non-coherent receiver.

One such method for facilitating coherent detection of transmitted signals is to use a pilot signal. For example, in a cellular communication system the forward channel, or down-link, (i.e., from base station to mobile unit) may be coherently detected if the base station transmits a pilot signal. Subsequently, all the mobile units use the pilot channel signal to estimate the channel phase and magnitude parameters. However, for the reverse channel, or up-link, (i.e., from mobile to base station), using such a common pilot signal is not feasible. As a result, those of ordinary skill in the art often assume that only non-coherent detection techniques are suitable for up-link communication. As a result, many recent publications have focused on optimizing non-coherent reception in DS-CDMA systems. Ideally a communication system should be designed to coherently receive DS-CDMA signals.

Thus, it is desirable to be able to utilize the benefits of a coherent receiver in the up-link of a CDMA communication system without experiencing the power limitation associated with the transmission of a pilot signal.

DETAILED DESCRIPTION OF THE PREFERRED EMBODIMENT

Generally stated, a receiver in a communication system implements coherent channel estimation by first receiving an encoded signal and then generating a complex channel estimate from the encoded signal. The receiver then combines the complex channel estimate with the encoded signal to produce a coherent demodulated signal. After combining, the receiver decodes a version of the coherent demodulated signal to produce an estimate of the encoded signal prior to encoding.

In the preferred embodiment, receiver is a RAKE receiver and the generation of the complex channel estimate is performed by a channel estimator. Also in the preferred embodiment, the version of the coherent demodulated signal further comprises a real part of the coherent demodulated signal, where the decoder decodes an aggregate of the real part of a plurality of coherent demodulated signals.

Figure 1:
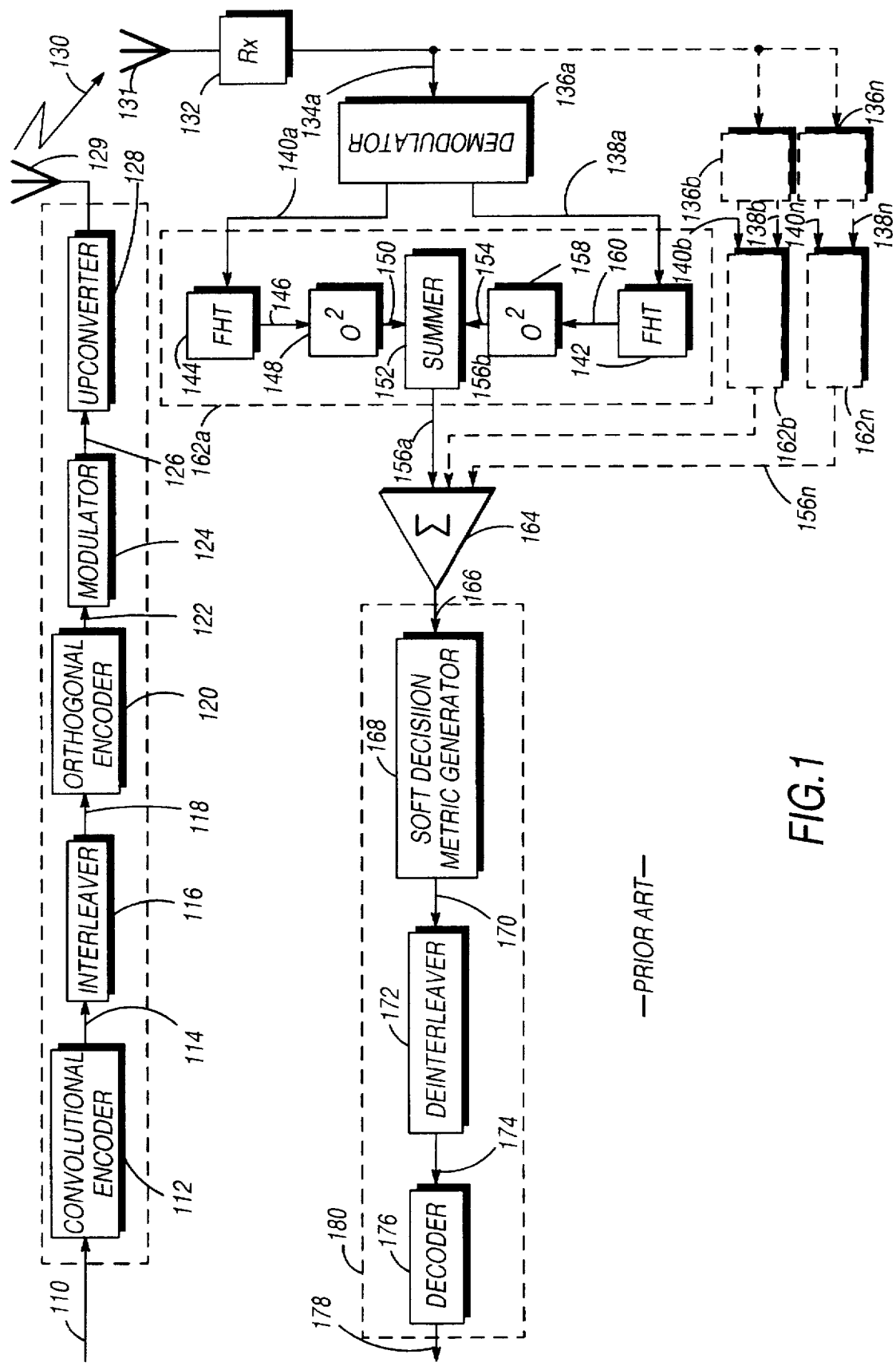
FIG. 1 generally depicts a block diagram of a communication system representative of the prior art.
Figure 2:
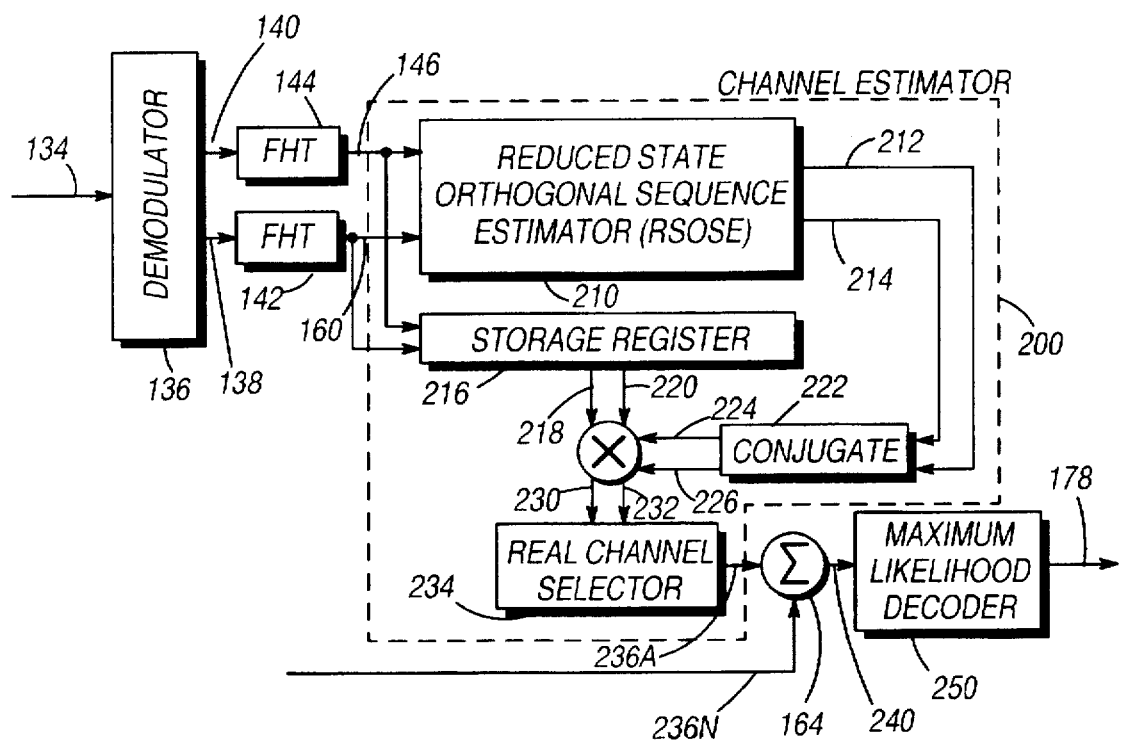
FIG. 2 generally depicts a block diagram representation of an exemplary embodiment communication system receiver which incorporates the channel estimator coupled to a Maximum Likelihood decoder to coherently receive and decode an orthogonally encoded spread spectrum signal.

The claimed invention of the pending application is best described with reference to the following figures. FIG. 1 generally depicts a block diagram of a communication system which is representative of the prior art. FIG. 2 generally depicts a block diagram representation of an exemplary embodiment communication system receiver which incorporates a channel estimator to coherently receive and decode an orthogonally encoded spread spectrum signal.

Referring first to the block diagram of FIG. 1, depicted is a representation which is indicative of a prior art communication system. Focusing on the receiver, an orthogonally encoded spread spectrum digital signal 130 is received at the receive antenna 131 and amplified 132 before being despread and demodulated 136 into its in-phase 140 and quadrature 138 digital signal components. The two components 138A, 140A of despread digital samples are then grouped into predetermined length groups (e.g., 64 sample length groups) of sampled signals that are independently input to orthogonal decoders in the form of fast Hadamard transformers 142, 144, which despread the orthogonally encoded digital signal components (140 and 138) producing a plurality of orthogonally demodulated digital signals (146 and 160) (e.g. when 64 sample length groups are input, then 64 despread signals are generated). In addition, each orthogonally demodulated digital signal (146, 160) has an associated Walsh index symbol which identifies each particular orthogonal code from within a set of mutually orthogonal codes (e.g. when 64 sample length groups are input, then a 6 bit length index data symbol can be associated with the transformer output signal to indicate the particular 64 bit length orthogonal code to which the transformer output signal corresponds). The energy values with the same index in each group of the resulting signal 156A from each branch of the RAKE receiver 156A, 156B ... 156N will then be summed 164 to provide a group of summed energy values 166. The energy value with index i in a group of summed energy values 166 corresponds to a measure of confidence that the group of sampled signals, which generate this group of summed energy values 166, corresponds to the i -th Walsh symbol. The group of summed energy values with associated indices will then be sent to a dual maxima metric generator 168 where a single metric for each encoded data bit is determined thereby producing a single set of aggregate soft decision data 170. The aggregate soft decision data 170 is then deinterleaved 172 prior to final maximum likelihood decoding 176. As stated above, the soft decision metric determination, in this case generated by the dual maxima metric generator 168 from the group of the summed energy values that contains both the real and imaginary orthogonally despread signals together with their noise components, plays a large role in the determining the sensitivity of the receiver.

As stated above, a more sensitive communication system could be developed if the noise associated with the imaginary component of the received signal could be reduced. Just such a communication system is described below with reference to FIG. 2.

FIG. 2 generally depicts a block diagram which represents a communication system receiver which incorporates a channel estimator 200 to coherently receive and decode an orthogonally encoded digital data signal. Specifically, FIG. 2 depicts two signal paths which are the in-phase 140 and quadrature 138 digital signal components of the orthogonally encoded spread spectrum signal 134 after processing by a common front end RAKE receiver, amplifier, and demodulator. The in-phase 140 and quadrature 138 digital signal components are then despread by orthogonal decoders 144 and 142 respectively. These orthogonal decoders 142, 144 are fast Hadamard transformers in the preferred embodiment, however any orthogonal decoder may be effectively substituted. The output of the orthogonal decoders 142, 144 are groups of orthogonally demodulated in-phase 146 and quadrature 160 digital signals with the associated Walsh symbol index. The groups of orthogonally demodulated in-phase 146 and quadrature 160 digital signals are coupled to a Reduced State Orthogonal Sequence Estimator (RSOSE) 210 and a storage register 216 simultaneously. The complex channel estimate, consisting of the in-phase 212 and quadrature 214 complex channel estimate components generated by the RSOSE 210, is conjugated 222. The conjugated complex channel estimate components (224 and 226, respectively) are coupled to a multiplier 228 where the components are multiplied with the original groups of despread signal components (218 and 220) retrieved from the storage register 216. The result is a pair of complex coherent orthogonally demodulated signals 230 and 232 coupled to a real channel selector 234 which selects a group of real coherent orthogonally demodulated signals 236. The group of real coherent orthogonally demodulated signals 236 is selected 234 from the groups of complex coherent orthogonally demodulated signals 230, 232, resulting from the multiplication process 136, for that particular orthogonally encoded signal (140,138). It should be noted that when using a RAKE receiver in a spread spectrum CDMA environment, it is understood that there will be N fingers to the RAKE receiver and, therefore, the system shown in FIG. 2 depicts 236A . . . N as representing the groups of real coherent orthogonally demodulated signals generated by each of the individual fingers being coupled to the summer 164. The summer 164 will add together all of the values with the same index in each group of real coherent orthogonally demodulated signals (236A . . . N) from all of the individual fingers of the RAKE receiver generating an aggregate coherent orthogonally demodulated signal 240. The aggregate coherent orthogonally demodulated signal 240 is subsequently passed to a convolutional decoder 250 for soft decision convolutional decoding.

Of particular interest in this process, is the channel estimate generation which occurs in the channel estimator 200. As stated above, the channel estimator 200 receives the groups of orthogonally demodulated in-phase 146 and quadrature 160 digital signals from the fast Hadamard transforms (144 and 142, respectively). The groups of orthogonally demodulated digital signals (146,160) are supplied to the RSOSE 210 and a storage register 216 simultaneously. The function of the storage register 216 is to simply buffer an "original" version of the groups of orthogonally demodulated digital signals (146 and 160) to be provided to the multiplier 228 as 218 and 200, respectively.

The Applicants now turn to the function of the RSOSE 210, however, in order to completely describe its function, a short explanation of the composition of an orthogonal signal is appropriate. The signaling scheme of Interim Standard 95 (IS 95) will be used as an example, although the claimed invention herein disclosed could be readily adapted for the coherent detection of any orthogonally encoded digital signal. In IS 95, every 6 interleaved and convolutionally encoded bits are mapped into one Walsh symbol. It is then further spread, modulated and transmitted. Every 6 Walsh symbols are organized as a power control group (PCG). As stated in the description of the prior art, the received signals are demodulated and despread before being separated into its in-phase and quadrature digital signal components, which may be viewed as a complex despread signal. When a sequence of 64 samples (or Walsh chips) of the complex despread signal is received, the real and imaginary parts of the signal sequence are correlated with 64 different possible Walsh symbols by using the orthogonal decoders (e.g. fast Hadamard transforms (FHT)). The 64 pairs, which may be viewed as 64 complex numbers (therefore containing both real and imaginary components), of the FHT outputs are used to determine which Walsh symbol was originally sent.

If the channel impulse response (CIR) coefficient C, a complex number, were known, the received signal sequence may be demodulated (phase corrected and weighted) first by multiplying the 64 complex received signal samples by the conjugate of C (hereafter, C'). The real part values of the 64 demodulated numbers are then orthogonally decoded and the imaginary values are discarded. Equivalently, the complex despread signal sequence may be first orthogonally despread by using FHTs. Then the 64 complex numbers of the FHT outputs are demodulated by multiplying the conjugate of C. The real values of the products are retained and the imaginary values are discarded. In reality, however, the coefficient of the channel impulse response is not known. Therefore, an estimate of the CIR coefficient must be calculated.

The generation of this channel estimate, the function of the RSOSE 210, will now be described with particularity. Let us denote the j-th chip of the n-th transmitted Walsh symbol by $w_j(n)$, in a Walsh symbol group. The received sample corresponding to this chip may be expressed as $$r(n,j) = Cw_j(n) + z(n,j) \quad (1)$$

where $z(n,j)$ is the additive noise/interference associated with the received signal. Assuming that the channel coefficient C does not change during the estimate period and that the maximum likelihood orthogonal sequence estimate (MLOSE) is based on a sequence of 6 64-Walsh symbols, the optimal MLOSE estimator computes $64^6$ correlation's for all possible combinations of i(n')s, which may be described mathematically as:

$$\sum_{n=1}^{6} \sum_{j=1}^{64} w_j^{i(n)} r(n,j) = C \sum_{n=1}^{6} \sum_{j=1}^{64} w_j^{i(n)} w_j(n) + z \quad (2)$$

where $W_j^{i(n)}$ is the j-th chip (mapped into ±1) of the Walsh symbol with index i in the Walsh code set, $i(n) = 1, \ldots, 64$ for $n = 1, \ldots, 6$, and z is the noise term. The MLOSE picks the correlation with the largest magnitude. If it picks the correct transmitted Walsh symbol sequence, $w_j^{i(n)} = w_j(n)$, the selected correlation (i.e. that with the largest magnitude) is equal to:

$$C' = \pm 384C + z \quad (3)$$

Therefore, it has been shown that this selected correlation is indeed an estimate of the channel coefficient. When the correlating sequence is not the same as the transmitted sequence, there will be additional errors in the estimate. In addition, the MLOSE requires $64^6$ different summations, which is impossible to compute in real time.

As a result, a suboptimal but computationally efficient method must be developed to make coherent channel estimation feasible. Such algorithms are, in general, referred to as Reduced State Orthogonal Sequence Estimator's (RSOSE), which require less circuitry and computational complexity than a true MLOSE, while still providing a performance level close to that of the MLOSE. Disclosed below is an exemplary embodiment of RSOSE for a Rake receiver with M fingers.

We denote complex FHT output of the m-th finger with index i for the n-th Walsh symbol data in a PCG as $W_m^{i(n)}(n)$, which is equal to $$\sum_{j=1}^{64} w_j^{i(n)} r(n,j)$$

for the m-th finger. To determine an approximate maximum likelihood complex channel estimate for the m-th finger, $$c_m(\tilde{i}(1),\tilde{i}(2),\tilde{i}(3),\tilde{i}(4),\tilde{i}(5),\tilde{i}(6)) = \sum_{n=1}^{6} W_m^{\tilde{i}(n)}(n),$$

where $\tilde{i}(n)$ is the estimate of the index of the Walsh codeword sent by the mobile as the n-th Walsh symbol in a PCG, the exemplary RSOSE algorithm is performed in 6 steps, as described below.

In the first step, the estimator generates the summed energies of each of the FHT outputs with the same index for each Walsh symbol, i.e.

$$e^j(n) = \sum_m |W_m^j(n)|^2,$$

keeping only the N largest summed energy values. The FHT output retained is denoted as $W_m^{i(n)}(n)$, $n=1, 2, \ldots, 6$.

In the second step, the estimator forms $N^2$ summations from the FHT output of the first and second Walsh symbols in the block for each finger, such that $c_m^{(1)}(\tilde{i}(1),\tilde{i}(2)) = W_m^{i(1)}(1) + W_m^{i(2)}(2)$.

The generated summations are sorted according to their summed energies, i.e., $$\sum_m |c_m^{(1)}(\tilde{i}(1),\tilde{i}(2))|^2$$

and only the N summations with the largest summed energies for each finger, denoted as $c_m^{(1)}(\hat{i}(2),\hat{i}(2))$ are retained.

The third step is forming $N^2$ summations of $c_m^{(1)}(\hat{i}(1), \hat{i}(2))$ and $W_m^{(3)}(3)$ for each finger as in step 2 and only the N summations with the largest summed energies, denoted as $C_m^{(2)}(\hat{i}(1),\hat{i}(2),\hat{i}(3))$ for each finger are kept. This step repeats for n=4, 5, 6 after which the estimator selects the summations with the largest summed energy in step 6, denoted as, $C_m = C_m^{(5)}(\hat{i}(1),\hat{i}(2),\hat{i}(3),\hat{i}(4)$ used as the channel estimate for coherent demodulation. Note that there is one channel estimate per finger.

After the complex channel estimate, C, (212 and 214) is generated, it is used to demodulate the received signal. Since the FHT is a linear operation, we can perform the demodulation at the output of the complex FHT (142 and 144) used prior to RSOSE estimation. Namely, the 64 groups of FHT output values of each Walsh symbol is demodulated by multiplying the output (218, 220) of the complex FHT's stored in the storage register 216 with the conjugate 222 of the channel estimate, C' represented as 224 and 226, respectively, generating complex coherent orthogonally demodulated signals 230 and 232. The real coherent orthogonally demodulated signals (236A, 236B, . . . , 236N) from a plurality of fingers of the RAKE receiver are summed 164 to produce an aggregate coherent orthogonally demodulated signal 240. The aggregate coherent orthogonally demodulated signal 240 is subsequently passed to a convolutional decoder which generates an estimated original data signal 178 which corresponds to the original data signal 110.

To further reduce the computation requirements of the RSOSE, instead of multiplying all 64 complex FHT outputs by the conjugate of the channel estimate, C', one need only multiply the 6N FHT outputs which generate the largest summed energy values, as determined in the step one of the RSOSE estimation, by the conjugate of the channel estimate (224,226) and taking its real component (236) to derive the soft decision metrics used in the maximum likelihood convolutional decoding process.

Finally, it should be pointed out that although described herein with particularity, this is but an example embodiment within which the claimed invention is effective. Particulary, many reduced complexity algorithms have been developed for convolutional decoding, such as the so-called "T-algorithm", "M-algorithm" and the "sequential decoding algorithm" all of which may be used in conjunction with the disclosed channel estimator with little modification. In addition, further improvement in the performance of the channel estimator itself is also possible, such as is disclosed in U.S. Application No. (Docket CE02930R), "Improved Channel Estimation in a Communication System" on behalf of Sexton et al. and commonly assigned to the assignee of the pending application

What we claim is:

1. A method of coherent channel estimation in a communication system, the method comprising the steps of:
   (a) receiving an encoded signal;
   (b) processing the encoded signal into its in-phase and quadrature digital signal components;
   (c) generating an orthogonally demodulated in-phase digital signal and an orthogonally demodulated quadrature digital signal from the in-phase and quadrature digital signal components;
   (d) generating an in-phase complex channel estimate and a quadrature complex channel estimate from the orthogonally demodulated in-phase digital signal and orthogonally demodulated quadrature digital signal;
   (e) generating a complex coherent orthogonally demodulated signal from the in-phase and quadrature channel estimates;
   (f) generating a real coherent orthogonally demodulated signal from the complex coherent orthogonally demodulated signal; and
   (g) decoding the real coherent orthogonally demodulated signal to produce an estimate of the encoded signal before encoding.

2. The method of claim 1, wherein the step of receiving the encoded signal is performed by a RAKE receiver having a plurality of fingers.

3. The method of claim 2, further comprising the steps of:
   (h) repeating steps (a)–(f) for each finger of the RAKE receiver;
   (i) summing the real coherent orthogonally demodulated signal generated in each finger of the RAKE receiver to form an aggregate coherently orthogonally demodulated signal; and
   (j) decoding the aggregate coherent orthogonally demodulated signal to produce an estimate of the signal before encoding.

4. The method of claim 1, wherein the step of generating a complex channel estimate is performed by a channel estimator.

5. The method of claim 1, wherein the version of the coherent demodulated signal further comprises a real part of the coherent demodulated signal.

6. The method of claim 1, wherein the step of decoding further comprises decoding an aggregate of the real part of a plurality of coherent demodulated signals.

7. The method of claim 1, wherein the step of generating an in-phase and quadrature complex channel estimate comprise the steps of:
   (a) generating a summed energy value for each of a plurality of FHT outputs with a same Walsh symbol index value, keeping only N largest summed energy values;
   (b) calculating $N^2$ summations from the FHT output of a first and a second Walsh symbol in a block such that $c_m^{(1)}(\tilde{i}(1),\tilde{i}(2)) = W_m^{i(1)}(1) + W_m^{i(2)}(2)$;

(c) sorting the $N^2$ summations by their relative energy values, retaining only the largest N summed energy values denoted as; $c_m^{(1)}(\hat{i}(1),\hat{i}(2))$ (d) forming summations of $c_m^{(1)}(\hat{i}(1),\hat{i}(2))$ and $W_m^{i(3)}(3)$ as in (b) keeping only the N largest summations; and (e) repeating (d) for n=4,5,6 until the largest summation, denoted as $C4_m=C_m^{(5)}(\hat{i}(1),\hat{i}(2),\hat{i}(3),\hat{i}(4),\hat{i}(5)$ component for the corresponding respective input signal component.

8. An apparatus for coherent channel estimation in a communication system, the apparatus comprising:

receiver which receives an encoded signal;

processor which processes the encoded signal into its in-phase and quadrature digital signal components, generates an orthogonally demodulated in-phase digital signal and an orthogonally demodulated quadrature digital signal from the in-phase and quadrature digital signal components, generates an in-phase complex channel estimate and a quadrature complex channel estimate from the orthogonally demodulated in-phase digital signal and orthogonally demodulated quadrature digital signal, generates a complex coherent orthogonally demodulated signal from the in-phase and quadrature channel estimates and generates a real coherent orthogonally demodulated signal from the complex coherent orthogonally demodulated signal; and decoder which decodes real coherent orthogonally demodulated signal to produce an estimate of the encoded signal prior to encoding.

9. The apparatus of claim 8, wherein the receiver further comprises a RAKE receiver having a plurality of fingers.

10. The apparatus of claim 9, wherein each finger of the RAKE receiver produces a real coherent orthogonally demodulated signal.

11. The apparatus of claim 10, further comprising a summer for summing the real coherent orthogonally demodulated signal from each finger of the RAKE receiver to form an aggregate of the real coherent orthogonally demodulated signals.

12. The apparatus of claim 11 wherein the decoder further decodes the aggregate of the real coherent orthogonally demodulated signals.

13. The apparatus of claim 8, wherein the function of the apparatus may be performed within a very large scale integration (VLSI) integrated circuit or, an application specific integrated circuit (ASIC).

14. The apparatus of claim 8, wherein the decoder further comprises a maximum likelihood sequence estimator (MLSE) decoder.

* * * * *

UNITED STATES PATENT AND TRADEMARK OFFICE
CERTIFICATE OF CORRECTION

PATENT NO. : 5,754,599
DATED : May 19, 1998
INVENTOR(S) : Ling, et al.

It is certified that error appears in the above-indentified patent and that said Letters Patent is hereby corrected as shown below:

Column 9, line 7 reads "$C_{4m}c_m^{(5)}(\tilde{i}(1),\tilde{i}(2),\tilde{i}(3),\tilde{i}(4),\tilde{i}(5$ component" should be -- $C_m = c_m^{(5)}(\tilde{i}(1),\tilde{i}(2),\tilde{i}(3),\tilde{i}(4),\tilde{i}(5),\tilde{i}(6))$, which is used as the complex channel estimate component --.

Signed and Sealed this

Eighth Day of September, 1998

Attest:

BRUCE LEHMAN

*Attesting Officer*              *Commissioner of Patents and Trademarks*